United States Patent
Schneider et al.

(10) Patent No.: US 7,042,953 B2
(45) Date of Patent: May 9, 2006

(54) METHOD AND ARRANGEMENT FOR COMPENSATING SIGNAL ECHOES DURING DUPLEX DATA TRANSMISSION WITH DISCRETE MULTITONE MODULATION

(75) Inventors: Stefan Schneider, Graz (AT); Heinrich Schenk, Munich (DE); Dietmar Straeussnigg, Villach (AT)

(73) Assignee: Infineon Technologies AG, München (DE)

( * ) Notice: Subject to any disclaimer, the term of this patent is extended or adjusted under 35 U.S.C. 154(b) by 646 days.

(21) Appl. No.: 10/157,742

(22) Filed: May 29, 2002

(65) Prior Publication Data

US 2003/0012291 A1 Jan. 16, 2003

Related U.S. Application Data

(63) Continuation of application No. PCT/EP00/12118, filed on Dec. 1, 2000.

(30) Foreign Application Priority Data

Dec. 14, 1999 (DE) ............................ 199 60 242

(51) Int. Cl.
*H04K 1/10* (2006.01)
(52) U.S. Cl. ............................ 375/260; 375/285
(58) Field of Classification Search ........... 375/260, 375/285; 370/286–292; 379/3, 406.1–406.16; 455/570
See application file for complete search history.

(56) References Cited

U.S. PATENT DOCUMENTS

| | | | |
|---|---|---|---|
| 5,317,596 A | 5/1994 | Ho et al. | 375/14 |
| 5,661,813 A * | 8/1997 | Shimauchi et al. | 381/66 |
| 5,896,452 A * | 4/1999 | Yip et al. | 379/406.01 |
| 6,377,683 B1 * | 4/2002 | Dobson et al. | 379/406.12 |
| 6,519,291 B1 * | 2/2003 | Dagdeviren et al. | 375/260 |

FOREIGN PATENT DOCUMENTS

| | | |
|---|---|---|
| EP | 0 933 897 A2 | 4/1999 |
| WO | WO 95/17046 | 6/1995 |

\* cited by examiner

*Primary Examiner*—Don N. Vo
(74) *Attorney, Agent, or Firm*—Jenkins, Wilson, Taylor & Hunt, P.A.

(57) ABSTRACT

A system and method for compensating for signal echoes during duplex data transmission with discrete multitone modulation includes determining, the error of a first reference channel. The error of the first reference channel is determined in the frequency domain and is used to correct the other channels. The first reference channel is then corrected with a second error from a second reference channel.

12 Claims, 3 Drawing Sheets

METHOD AND ARRANGEMENT FOR COMPENSATING SIGNAL ECHOES DURING DUPLEX DATA TRANSMISSION WITH DISCRETE MULTITONE MODULATION

Method and arrangement for compensating signal echoes during duplex data transmission with discrete multitone modulation This application is a continuation of International Application No. PCT/EP00/12118, filed Dec. 1, 2000, pending, which claims the benefit of German application no. DE 199 60 242.5, filed Dec. 14, 1999, currently pending.

FIELD OF THE INVENTION

The invention relates to a method for compensating echoes during discrete multitone modulation DMT as is known from EP 0 933 892 A2, and a corresponding arrangement for compensating interference signal echoes during duplex transmission of digital data by means of discrete multitone modulation (DMT), it being possible for the data rate to be different in both directions. Transmission with discrete multitone modulation is known and therefore does not need to be described further at this point. The invention is preferably employed in data communication systems.

BACKGROUND OF THE INVENTION

During duplex data transmission over a two-wire line, i.e. when there is simultaneous transmission in both directions (upstream and downstream), both the useful signal originating from the opposite station and echoes resulting from the original station's own transmitter occur at the respective receiver inputs. An echo is the undesired inputting of a transmission signal into the receiver of the same station, said transmission signal being superimposed on the desired transmission and thus causing interference with it. These echoes are primarily due to incorrectly adapted impedances of the hybrid connector. Whereas the interference echoes can be suppressed by selective filters in transmission methods with a separate frequency position, in transmission methods with identical frequency position special devices are necessary for echo compensation.

The compensation or canceling out of echoes can be carried out either in the time domain or in the frequency domain. When echoes are cancelled out in the time domain, the echo parameters are derived by sampling what is passing through the echo channel and the echo emulation involves a complex time domain convolution. During the canceling out of the echo in the frequency domain, the echo parameters are acquired by sampling the spectrum of the echo channel.

An echo emulation and an adaptive update process can then take place in the frequency domain, for which purpose the estimated value of the spectrum of the echo channel is used. Discrete multitone modulation (DMT) is a form of multicarrier, which is carried out with digital signal processing, an IFFT/FFT pair being used as modulation/demodulation vectors. FTT means "Fast Fourier Transform" and IFFT means "Inverse Fast Fourier Transform". The known device can be applied to asymmetrical data transmission. By combining a cyclical convolution with a linear convolution the cyclical convolution can be carried out more quickly in the frequency domain with block multiplication, the short linear convolution being performed in the time domain. This is described, for example, in U.S. Pat No. 5,317,596. As the echoes which occur depend very greatly on the analogue switching and the parameters of the line used, it is generally necessary to set the echo compensator adaptively.

With frame-synchronous transmission in which the timing position of the transmission and reception FFT frames correspond precisely, the greater component of the echo can be compensated by using a frequency domain compensator, as is known, for example from U.S. Pat. No. 5,317,596. With this known compensator it is possible in principle to compensate only the periodic parts of the echoes at each frequency. In systems whose transient response extends over the length of the "cyclic prefix", an a periodic echo component which cannot be compensated with the known device occurs additionally.

For this reason, a time domain echo compensator is additionally used, said compensator processing the sampled values of the transmission signal and subtracting the resulting sampled values from the sampled values of the reception signal. As the sampled values have to be processed with the sampling frequency of the transmission or reception signal, the computational capacity necessary for this is very large.

The invention is therefore based on the object of permitting the a periodic echo component to be compensated with a smaller computational capacity than in the prior art.

According to the invention, this object is achieved by means of the method according to claim 1 and by means of the arrangement according to claim 12. Preferred refinements of the invention are the subject-matter of the dependent claims.

SUMMARY OF THE INVENTION

During the initialization phase, i.e. when there is no signal from the opposite end (far end signal), the error of any first reference channel, referred to below as "first error", is determined in the frequency domain, that is to say downstream of the Fourier transformation, directly from the difference between the transmission signal and reception signal of this channel. This first error is used to correct the other frequency channels, the first error being preferably weighted in order to correct a respective channel with a channel-specific coefficient. The first reference channel is then preferably corrected with an error of any second reference channel. This "second error" is determined from the difference between the transmission signal and reception signal of the second reference channel in the initialization phase and is preferably also weighted with a channel-specific coefficient. The signal from the opposite end must also be taken into account in the case of transmission. The coefficients used can be determined iteratively, for example according to the mean-square-error method.

Because of the signal processing in the frequency domain, the necessary computational capacity is comparatively low. This becomes clear from the following numbers: In an ADSL transmission system the sampling frequency of the receiver is approximately 2.2 MHz (cycle time=0.45 microseconds), and the length of an FFT frame is approximately 250 microseconds.

BRIEF DESCRIPTION OF THE FIGURES

Preferred refinements of the invention are explained in more detail below with reference to the drawings, in which.

DETAILED DESCRIPTION OF THE PREFERRED EMBODIMENTS

Figure 1:
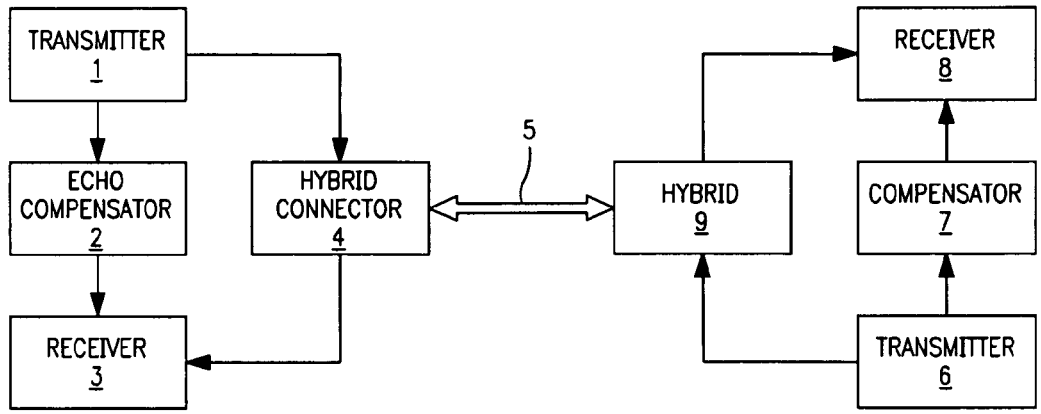
FIG. 1 shows the basic view of a duplex transmission system with echo compensation.

FIG. 1 shows the basic arrangement of such a duplex transmission system with echo compensation with a first station which is composed of a transmitter 1, an echo compensator 2, a receiver 3 and a hybrid connector 4 and which has a duplex connection via a line 5 to a second station which is correspondingly composed of a transmitter 6, a compensator 7, a receiver 8 and a hybrid 9.

Figure 2:
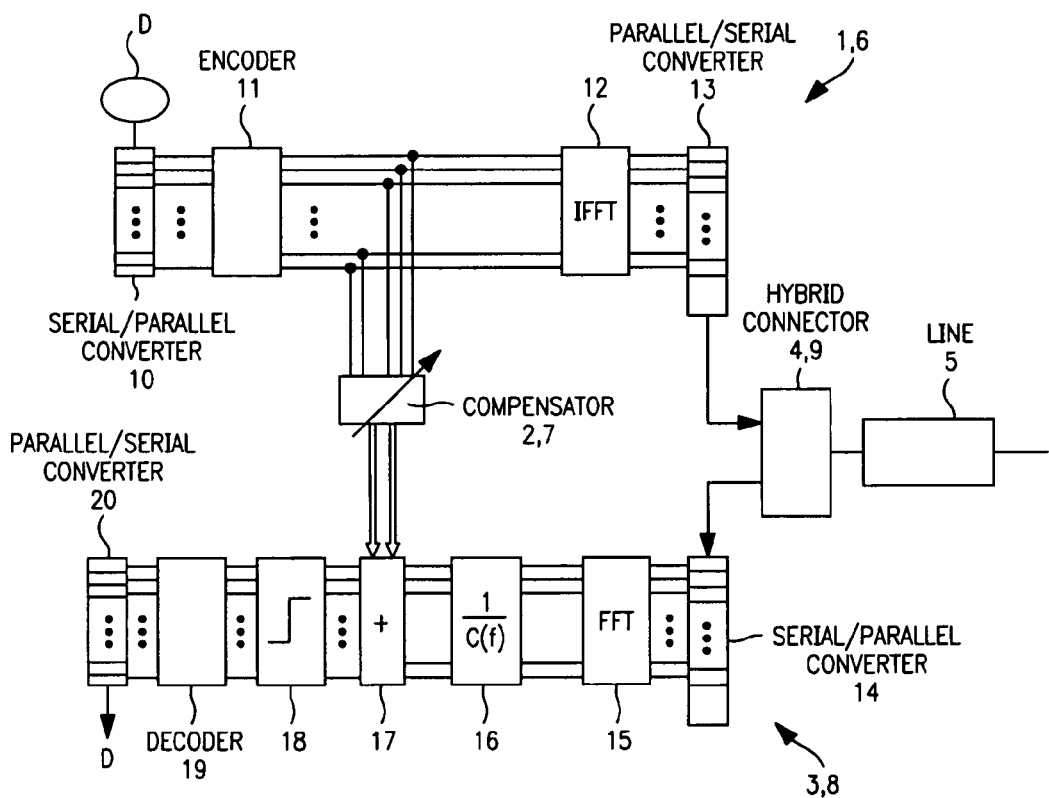
FIG. 2 shows a schematic view of a transmission/reception station from FIG. 1.

FIG. 2 shows a schematic view of a transmission/reception station in FIG. 1 composed of a transmission part 1 and a reception part 3. Such a DMT station has a serial/parallel converter 10 which converts the data D to be transmitted into a parallel bit stream, whose bits are combined to form blocks. An encoder 11, which assigns a complex number to a specific number of bits in a block, is arranged downstream. By means of this complex number a carrier frequency $f_i = i/T$ where $i = 1, 2, \ldots N/2$ of the discrete multitone modulation is defined. By means of an inverse Fourier transformation 12, the carrier frequencies $f_i$ which are represented by means of signal vectors are transformed into the time domain and directly constitute there N sampled values of a DMT signal to be transmitted Downstream of a parallel/serial converter 13, the signal passes via the hybrid connector 4 onto the line 5.

An incoming DMT signal passes via the hybrid connector 4 into the receiving section 3 of the station. A serial/parallel converter 14 receives digital sampled values of a signal which is generated with DMT and forms blocks from them, a block having a multiplicity of N parallel signals. A Fourier transformation 15 generates from this a multiplicity of carrier frequencies $F_i$ which are fed to a frequency-dependent equalizer 16. An adder 17 compensates the echo by means of the echo compensation signal generated by the compensator 2. A subsequent decision element 18 decides which signal state in the signal state space of the carrier frequencies modulated using QAM (Quadrature Amplitude Modulation) corresponds to a supplied signal vector. A decoder 19 decodes the included signals from the supplied value-discrete signal vector, said signals being output as data downstream of a parallel/serial converter 20.

Figure 3:
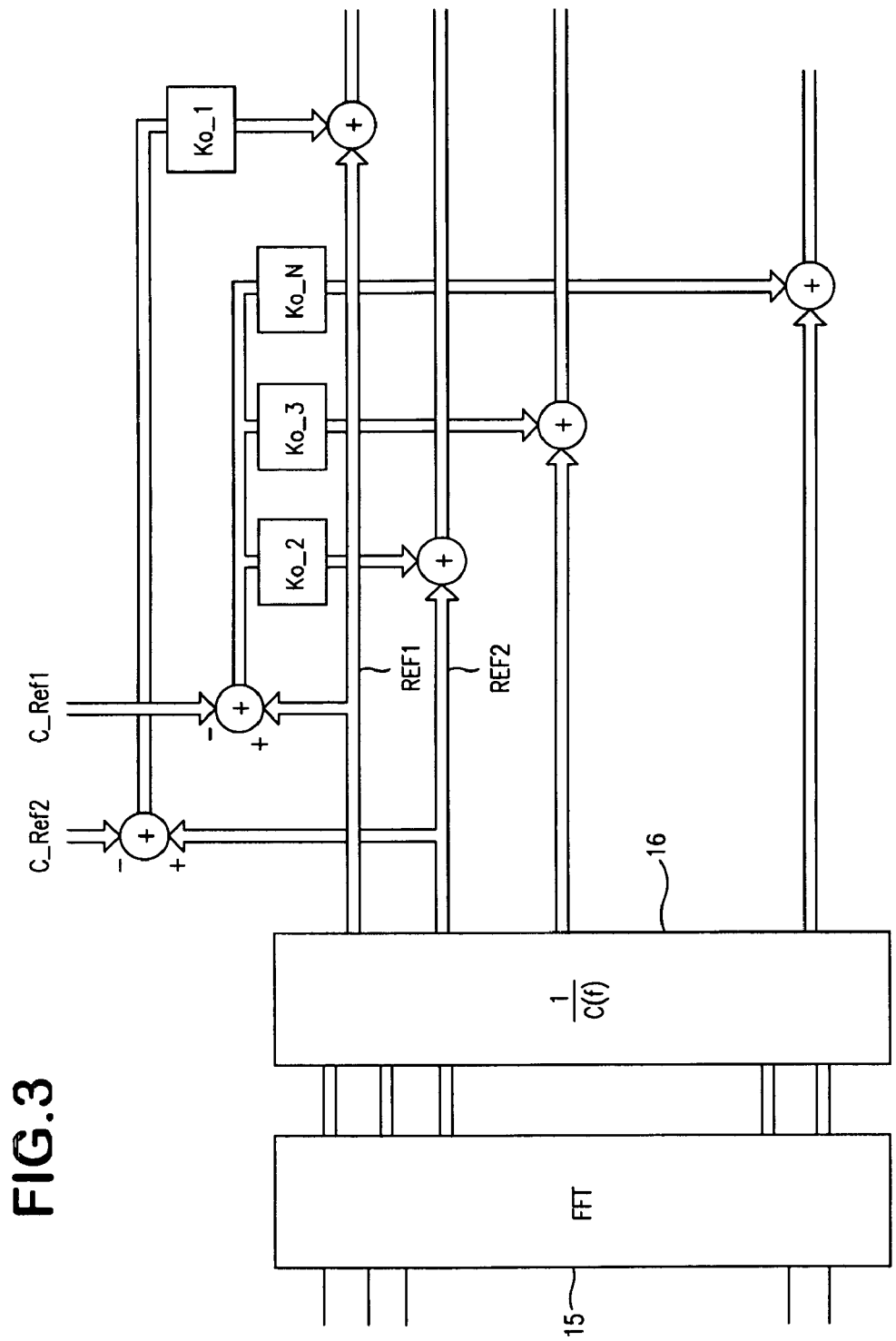
FIG. 3 shows a block circuit diagram of the compensator arrangement according to the invention during the stabilization phase.

FIG. 3 shows the block circuit diagram of the echo compensation according to the invention in the receiver in FIG. 2. In the invention, the error of the reference channel Ref1, the top channel, for example, in FIG. 2, can be determined directly from the difference between the transmission value and reception value during the initialization phase (phase without far end signal). In what follows, this error is referred to as the first error. Double lines symbolize in each case complex signals. C_Ref1 and C_Ref2 designate the transmission signal of the first and second reference channel Ref1 and Ref2. The weighting of the first error is performed with coefficients Ko_2 to Ko_N. The addition of the weighted first error to the signals of the other DMT channels is carried out at the points marked by (+).

In a further refinement of the invention, the echo of the first reference channel Ref1 can also be compensated. To do this, the error of a second reference channel Ref2, referred to below as a second error, is added to the signal of the first reference channel Ref1. The second error is obtained here as the difference between the transmission signal C_Ref2 and the reception signal of a second reference channel Ref2 during the initialization phase.

Figure 4:
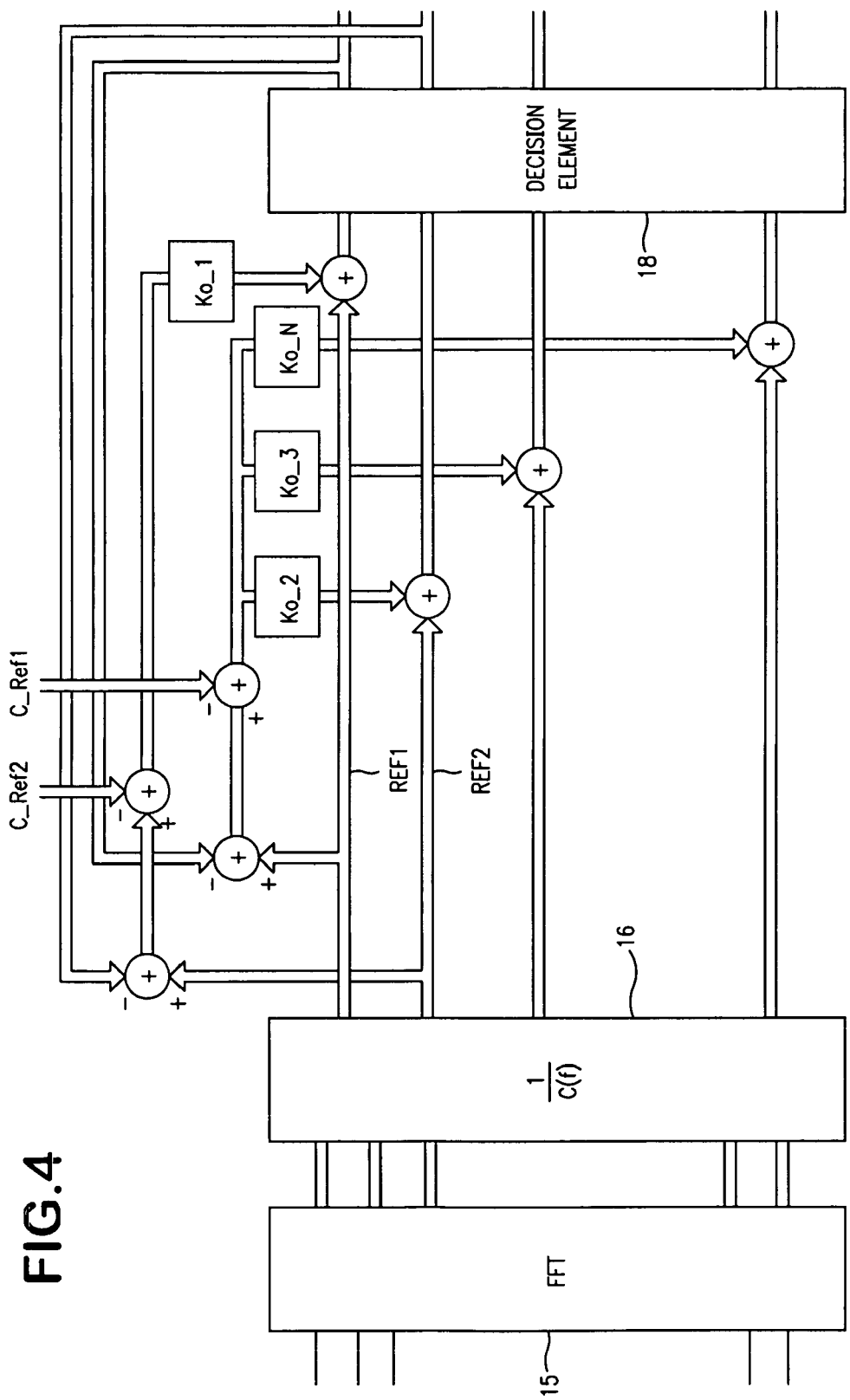
FIG. 4 shows a block circuit diagram of the compensator arrangement according to the invention during the transmission phase.

FIG. 4 shows the situation during the transmission phase. As there is a signal from the opposite end (far end signal) here, it must also be subtracted. For this purpose, the difference between the reception signals of the first reference channel Ref1 downstream of the equalizer 16 and downstream of the decision element 18 is first formed, and the transmission signal C_Ref1 of the first reference channel Ref1 is subtracted so that the first error is obtained. This is then added, with suitable weighting coefficients, to the respective DMT channels. The second error for correcting the first reference channel Ref1 is acquired in an analogous fashion. The difference between the reception signals of a second reference channel Ref2 downstream of the equalizer 16 and downstream of the decision element 16 [sic] is formed. The transmission signal C_Ref2 of the second reference channel is subtracted from this and the second error is obtained in the transmission mode. This error is added, with suitable weighting with a coefficient K_1, to the signal of the first reference channel at a point marked by (+).

The calculation of the coefficients for the valuation of the error can be carried out iteratively or in a closed form. An example of such a method for calculating the coefficients is the mean-square-error method.

List of reference symbols

| | |
|---|---|
| 1 | Transmitter |
| 2 | Compensator |
| 3 | Receiver |
| 4 | Hybrid |
| 5 | Line |
| 6 | Transmitter |
| 7 | Compensator |
| 8 | Receiver |
| 9 | Hybrid Connector |
| 10 | Serial/parallel converter |
| 11 | Encoder |
| 12 | IFFT |
| 13 | Parallel/serial converter |
| 14 | Serial/parallel converter |
| 15 | FFT |
| 16 | Equalizer |
| 17 | Adder |
| 18 | Decision element |
| 19 | Decoder |
| 20 | Parallel/serial converter |
| D | Data |

The invention claimed is:

1. A method for compensating echoes during discrete multitone modulation DMT, a compensation being performed in a frequency domain, comprising:

during an initialization phase in which there is no signal from an opposite end, a first error of a frequency channel which is defined as a first reference channel is derived from a difference between a transmission value and reception value of the first reference channel, and said first error is used to correct other DMT frequency channels by weighting said first error with coefficients which are specific to said other DMT frequency channels, prior to adding said first error to said other DMT frequency channels.

2. The method according to claim 1 wherein the error is added to the signals of the other DMT frequency channels.

3. The method according to claim 1, wherein the signal from the opposite end is taken into account during a transmission phase.

4. The method according to claim 3, wherein in order to determine the error of the first reference channel, a first difference is first formed between a reception signal of the first reference channel after a transformation into the frequency domain and the reception signal of this channel downstream of a decision element, and a second difference is subsequently formed from the first difference and a transmission signal of the first reference channel.

5. The method as claimed in claim 1, wherein during the initialization phase, the first reference channel is corrected by means of a second error formed from the difference between a transmission signal and a reception signal of a second reference channel of the frequency channels.

6. The method according to claim 5, wherein the second error is added to the signals of the first reference channel.

7. The method according to claim 6, wherein the second error is weighted with a coefficient.

8. The method according to claim 5, wherein the signal from the opposite end is taken into account in the second error during the transmission phase.

9. The method according to claim 8, wherein in order to determine the error of the second reference channel, a first difference is first fanned between the reception signal of the reference channel after the transformation into the frequency domain and the reference signal of this channel downstream of the decision element, and a second difference is subsequently formed from the first difference and the transmission signal of the second reference channel.

10. The method according to claim 1, wherein the coefficients are determined using an iterative algorithm for error minimization.

11. A device for compensating for echoes during discrete multitone modulation (DMT), said device comprising:
an echo-compensation system, which operates in a frequency domain and is connected to a plurality of frequency channels, having at least one of said plurality of frequency channels defined as a reference channel and others of the plurality of frequency channels defined as remaining DMT channels, said echo compensation system comprising:
an error determining unit, which is connected to a transmission path and a reception path of said reference channel for deriving a first error;
a weighting unit which is connected to an output of the error determining unit for weighting said first error;
an addition unit, which is connected between said weighting unit and the reception oath of said remaining DMT channels for adding said first error to said remaining DMT frequency channels;
a Fast Fourier Transformer unit, which is arranged upstream of a first and a second connection point; and
a decision element, which is arranged downstream of said first connection point and said second connection point, at which said determining unit is connected to said reception path and said addition unit is connected to said reception path, respectively.

12. A system for compensating for echoes during discrete multitone modulation DMT, a compensation being performed in a frequency domain, comprising:
means for deriving a first error of a frequency channel during an initialization phase in which there is no signal from an opposite end, wherein the first error of the frequency channel is defined as a first reference channel, and wherein the first error is derived from a difference between a transmission value and a reception value of the first reference channel, and
means for said first error to correct other DMT frequency channels by weighting said first error with coefficients which are specific to said other DMT frequency channels, prior to adding said first error to said other DMT frequency channels.

* * * * *